W. E. OLIVER.
PROJECTING PHOTOGRAPHIC IMAGES IN NATURAL COLORS.
APPLICATION FILED MAR. 3, 1910.
973,962.
Patented Oct. 25, 1910.
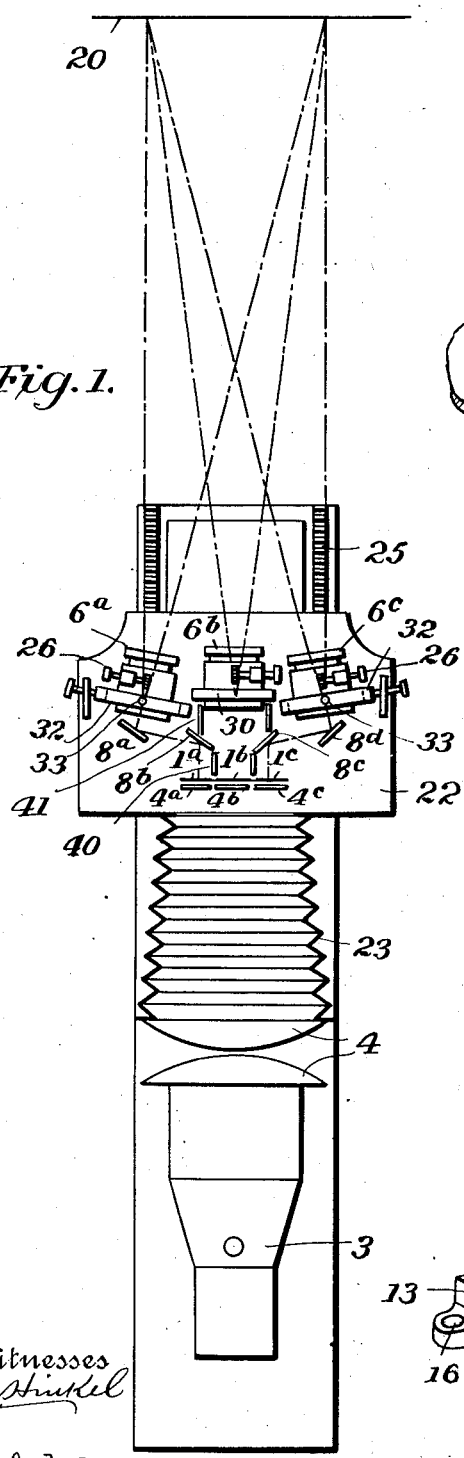
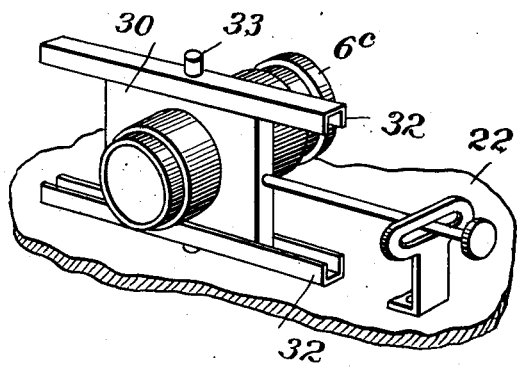
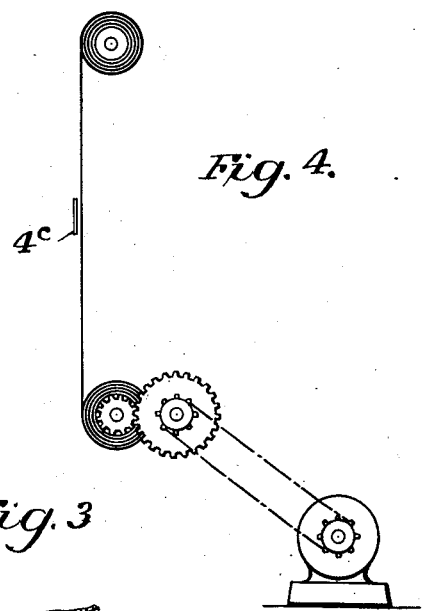
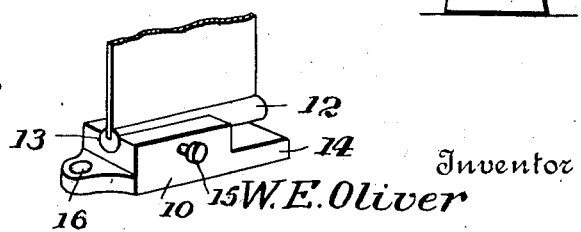
Witnesses
Charles N. Murray
Inventor
W. E. Oliver
by Eugene C. Brown
Attorney

UNITED STATES PATENT OFFICE.

WILLIAM E. OLIVER, OF WASHINGTON, DISTRICT OF COLUMBIA, ASSIGNOR TO THE OLIVER TRI-CHROMATIC COMPANY, OF WASHINGTON, DISTRICT OF COLUMBIA, A CORPORATION OF VIRGINIA.

PROJECTING PHOTOGRAPHIC IMAGES IN NATURAL COLORS.

973,962.     Specification of Letters Patent.     Patented Oct. 25, 1910.

Application filed March 3, 1910. Serial No. 547,037.

*To all whom it may concern:*

Be it known that I, WILLIAM E. OLIVER, a citizen of the United States, residing at Washington, District of Columbia, have invented new and useful Improvements in Projecting Photographic Images in Natural Colors, of which the following is a specification.

This invention relates to the optical projection of photographic records and especially to the projection of records which have been produced by the well-known three-color process in which each portion of the tri-color film has a different color value corresponding to the primary colors—red, green and blue or blue-violet.

The principal object of my invention is to provide a method of projecting such tri-color records upon a display curtain or screen in such a manner that the three colors shall be accurately superposed and synthetically blended into a composite picture having the objects portrayed in their true natural colors.

The several methods which have heretofore been attempted have been defective in a number of particulars and have been unable to produce the desired results above specified. It has been proposed to arrange the three images of the tripart record serially upon the film and to project these in rapid succession through a single lens in coöperation with a three-part shutter or screen having the proper colors to correspond with the respective color values of the record. This method, however, proved to be impracticable inasmuch as it depended upon the persistence of vision to produce the illusion of a single picture from the three distinct images projected separately in the several primary colors. Moreover, it required three separate exposures to produce such a tripart record, which could only be accomplished if the original object being photographed were still or at least moving very slowly. Furthermore, in the event of a breakage in the film the services of a skilled attendant would be required to make the repairs, since the slightest displacement of the images would not only destroy the illusion but would also throw the succeeding portions of the record tape out of color registry with the proper corresponding color screen. It has also been proposed to produce the photographic record by means of two lenses projecting the images alternately upon separate films or sensitized ribbons, usually an endless band, and to employ tri-colored bands or screens moving synchronously with the films. It is obvious, however, that this method is open to the same objections as the previous method and cannot produce satisfactory results. Other methods have been proposed but in so far as I am aware none have been able to produce satisfactory results.

My invention will be more clearly understood from the following description, taken in connection with the conventional diagrams of the accompanying drawings which are merely used for purposes of illustration and in which—

Figure 1, is a plan view showing an arrangement of the optical elements for carrying out my invention; Fig. 2, is a detail view showing the manner in which the side lenses may be adjusted; Fig. 3, is a detail view of one form of adjustment applied to the reflections; and Fig. 4, is a side view showing the relation of the color screen and the record film.

The trichromatic photographic records which I employ are arranged in lateral juxtaposition upon a single film or photographic tape, the three images of each object being produced simultaneously and preferably in a camera of my invention designed to make such records and which forms the subject-matter of another application for patent.

My invention is particularly adapted to moving picture machines by reason of the fact that each set of the three-color value records is exposed simultaneously and therefore under a single time location and light condition; the picture plane is coextensive and likewise the intervals of movement between the different record sets.

The record film or tape 1, may be moved by means of any suitable driving mechanism such as ordinarily employed in moving-picture machines. Each image of the tri-part record $1^a$, $1^b$, $1^c$, receives light of the color corresponding to its color-value from the light source, which may be the ordinary stereopticon 3, transmitted through condensing lenses 4, so placed as to give the maximum illumination, and passing through the green, red and blue color-screens $4^a$, $4^b$, $4^c$.

The light rays passing through the central record are transmitted by the lens $6^b$ and projected directly upon the screen. It is necessary that the rays passing through the side records should converge in order to coincide with the image projected through the central lens and for practical reasons it is also necessary that the rays of the outer or side records should be displaced laterally inasmuch as the width of the three lenses is considerably greater than that of the tripart record tape.

When prisms are employed as reflectors of the light rays, a certain amount of the energy of the light waves is absorbed in passing through the glass medium and this is true also of mirrors since the light must twice pass through the thickness of the glass. In order to avoid this diminution in the light energy transmitted through the outer record parts, I prefer to employ reflectors having a highly polished reflecting surface and thereby obtain a divergence laterally and a change in direction of the light rays with practically no appreciable loss in the light intensity. These reflecting surfaces are arranged in pairs $8^a$, $8^b$, and $8^c$, $8^d$, one pair for each side lens. The reflectors are mounted in a frame 10, provided with means for universal adjustment as shown in the detail view, Fig. 3. The rock shaft 12 is adapted to swing forward or backward in a vertical plane and may also be moved laterally in the socket 13 of the base member 14, the parts being locked in any position by the set screw 15. The base 14, is angularly adjustable in a longitudinal plane upon the pivot screw 16. By means of these adjustments I am enabled to center the light rays transmitted through the outer records upon the optical axis of the corresponding lens in any position of the latter.

In all prior attempts to produce photographic images in natural colors by means of a plurality of lenses in so far as I am aware, no provision was made for accurately superimposing the images upon the screen when the projecting apparatus was placed at different distances. In my present method I make provision for the accurate superposition of the three focal planes at whatever distance the apparatus may be placed from the screen. The rough adjustment of the light focus upon the screen 20 may be made in the usual manner employed in stereopticons by mounting the box or hood containing lenses, reflectors, film carriers and appurtenances upon a base-board or platform 22, attached to the outer end of the bellows 23, and adjustable longitudinally upon the supporting racks 25. The finer adjustment of the focus upon the screen is effected by a forward or backward movement of the lenses in their casings by means of the adjusting screws 26.

After the proper focus of the light upon the screen transmitted by the central lens $6^b$ has been made, the outer lenses $6^a$ and $6^c$ must be adjusted angularly and laterally in order that their light rays shall converge in such a manner as to cause the focal planes of the three lenses to coincide upon the screen. Such adjustment may be accomplished by mounting the front-boards 30, carrying the side lenses, in grooves or ways 32 in the base-board 22, so that the lenses may be moved laterally toward or from the central lens and may also be swung angularly in a longitudinal plane about a pivot 33. This manner of provision is made for the accurate superposition of the focal planes of the outer lenses upon that of the central lens.

The focal distance of the central lens from the photographic image is the linear distance from the lens to the film $1^b$. The focal distance of each of the outer lenses is the length of the zigzag line along the path of the reflected light rays. Inasmuch as the focal distances of the three lenses must be equal, it is necessary that the outer lenses should be so mounted that they may be in the rear of the central lens as indicated in Fig. 1. The exact equality of focal distances may be made by means of the thumb adjusting screws 26. I believe I am the first to provide for the accurate superposition of the images at varying distances of the projecting apparatus from the screen which is absolutely necessary in a successful method involving the synthesis of the three color images.

Another important feature of my method of projecting light from the photographic records having different color-values, resides in the fact that I provide for the transmission of the different colored light rays to the composite picture upon the screen in substantially the full intensity of each color. The reflecting surfaces which are employed to diverge the rays of the two outside colors are placed intermediate the picture film and the lenses and closely adjacent the film in order that they may receive the fullest illumination from the light issuing from the condensing lens, the intensity of the light diminishing with the square of the distance. The reflectors receive the incident parallel rays extending across the entire image of the film. The light rays are then focused in the lens and project a sharp and distinct image directly upon the screen with the full illumination of the lens. I arrange that the red rays which have the lowest rate of wave-vibration shall be transmitted directly to the screen and therefore pass through the central lens. The blue and green rays which have a much higher rate of vibration and greater persistence are first reflected by the reflecting surfaces and then transmitted by their respective lenses. The loss in light intensity incurred by the use of reflecting surfaces is very slight as compared with prisms and mirrors. By transmitting the red color of slower vibration directly through the central lens and reflecting the green and blue having higher rates of vibration and which are more nearly alike in wave-vibration, I am enabled to secure a nearly perfect synthesis of colors.

The record tape may be moved intermittently in front of the color screens across the field of vision by any of the well-known motor devices employed in moving picture machines. In order that there may be no danger of interference between the light rays passing through the several divisions of the record tape, I provide diaphragms or division screens 40, 41, to completely separate one color from the other.

The advantages of my method of projecting pictures in natural colors will be appreciated from the previous description. The three different colored rays passing through the images of corresponding color-value upon the record film are, by my method of projection, transmitted in the proper light intensities and are synthetically blended into a composite picture upon the screen in which each element of the image portrayed is represented in the true natural color of the original object. I believe I am the first to discover the cause of the failure of prior methods to portray the picture in true color values. I am enabled to overcome this difficulty by the discovery that I could project the three primary colors in their proper relative intensities by transmitting the color having the lowest number of wave-vibrations, viz: the red, in the center and transmitting it directly; while the green and blue which have higher wave-vibrations could be reflected to converge in superposition thereon without appreciable loss of light intensity if the divergence were produced from highly polished surfaces instead of light absorbing mirrors and prisms. Provision is also made for the accurate adjustment of every element of the optical apparatus in order that each lens may be independently focused and the picture planes may be made to coincide upon the exhibition sheet or screen. Persistence of vision is not necessary to create the impression of a composite picture because the three colored images are simultaneously projected and superposed upon the screen and constitute in effect a single picture having each portion represented in its true natural colors. Every portion of the composite picture can be sharply focused upon the screen and will receive its proper illumination, thus overcoming the defects of prior methods to which I have previously alluded.

For purposes of illustration, in order to explain the principles of my invention, I have described somewhat in detail the mechanical arrangements in which it may be embodied, but it is to be understood that I am not confined to these and that various changes may be made therein without departing from the spirit of this invention or the scope of my claims.

The method disclosed herein is claimed in my prior application, Serial Number 483,530, filed March 15, 1909.

Having thus set forth the principles of my invention and illustrated a manner in which it may be carried out, I claim—

1. Apparatus for projecting pictures in natural colors comprising a film having a plurality of transversely arranged like images of the object or scene to be reproduced, in three primary color values, a plurality of projecting lenses, means for axial and rotary adjustment of said lenses, and means interposed between said film and said lenses for diverging light rays transmitted through the outer images in opposite directions and converging them in a manner to coincide with light rays passing directly through the central image and central lens.

2. Apparatus for projecting pictures in natural colors comprising a film having a plurality of transversely arranged like images of the object or scene to be reproduced in three primary color values, a plurality of projecting lenses, means for axial, lateral, and rotary adjustment of said lenses, means interposed between said film and said lenses for diverging light rays transmitted through the outer images in opposite directions and converging them in a manner to coincide with light rays passing directly through the central image and central lens, and means for adjusting said reflectors in vertical and horizontal planes.

3. Apparatus for projecting photographic images in natural colors comprising a tripart film having like images of each pose of the object or scene to be projected in juxtaposition and the images having different primary color values, means for projecting rays of light from a suitable source through said film, a plurality of projecting lenses corresponding with the film images, and means interposed between said film and said lenses to first diverge and then converge the light rays passing through the outer film-images.

In testimony whereof I have hereunto set my hand in presence of two subscribing witnesses.

WILLIAM E. OLIVER.

Witnesses:
E. C. BROWN,
F. G. SHAW.